United States Patent
Chen (10) Patent No.: US 8,193,283 B2
(45) Date of Patent: *Jun. 5, 2012

(54) GOLF BALLS WITH SOFT, RESILIENT BIMODAL IONOMERIC COVERS

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 654 days.

This patent is subject to a terminal disclaimer.

(21) Appl. No.: 12/315,731

(22) Filed: Dec. 5, 2008

(65) Prior Publication Data

US 2009/0182089 A1    Jul. 16, 2009

Related U.S. Application Data

(60) Continuation-in-part of application No. 11/893,831, filed on Aug. 17, 2007, now Pat. No. 7,488,778, which is a continuation of application No. 11/101,078, filed on Apr. 6, 2005, now Pat. No. 7,273,903, which is a continuation of application No. 10/854,725, filed on May 26, 2004, now Pat. No. 7,037,967, which is a division of application No. 10/376,969, filed on Feb. 28, 2003, now Pat. No. 6,762,246, which is a division of application No. 09/924,194, filed on Aug. 8, 2001, now Pat. No. 6,562,906.

(60) Provisional application No. 60/224,668, filed on Aug. 11, 2000, provisional application No. 60/279,023, filed on Mar. 27, 2001.

(51) Int. Cl.
*A63B 37/00* (2006.01)
*A63B 37/12* (2006.01)
*C08L 33/02* (2006.01)

(52) U.S. Cl. ......... 525/196; 525/93; 525/127; 525/130; 525/166; 525/169; 525/170; 525/179; 525/183; 525/201; 525/221; 473/372; 473/385

(58) Field of Classification Search .................. None
See application file for complete search history.

(56) References Cited

U.S. PATENT DOCUMENTS

| | | |
|---|---|---|
| 3,651,014 A | 3/1972 | Witsiepe |
| 3,763,109 A | 10/1973 | Witsiepe |
| 3,766,146 A | 10/1973 | Witsiepe |
| 4,264,075 A | 4/1981 | Miller et al. |
| 4,274,637 A | 6/1981 | Molitor |
| 4,323,247 A | 4/1982 | Keches et al. |
| 4,331,786 A | 5/1982 | Foy et al. |
| 4,337,947 A | 7/1982 | Saito et al. |
| 4,398,000 A | 8/1983 | Kataoka et al. |
| 4,526,375 A | 7/1985 | Nakade |
| 4,567,219 A | 1/1986 | Tominaga et al. |
| 4,674,751 A | 6/1987 | Molitor et al. |
| 4,690,981 A | 9/1987 | Statz |
| 4,846,910 A | 7/1989 | Brown |
| 4,884,814 A | 12/1989 | Sullivan |
| 4,911,451 A | 3/1990 | Sullivan et al. |
| 4,984,804 A | 1/1991 | Yamada et al. |
| 4,986,545 A | 1/1991 | Sullivan |
| 5,000,459 A | 3/1991 | Isaac |
| 5,068,151 A | 11/1991 | Nakamura |
| 5,098,105 A | 3/1992 | Sullivan |
| 5,120,791 A | 6/1992 | Sullivan |
| 5,155,157 A | 10/1992 | Statz et al. |
| 5,197,740 A | 3/1993 | Pocklington et al. |
| 5,222,739 A | 6/1993 | Horiuchi et al. |
| 5,253,871 A | 10/1993 | Viollaz |
| 5,298,571 A | 3/1994 | Statz et al. |
| 5,321,089 A | 6/1994 | Cadorniga et al. |
| 5,328,959 A | 7/1994 | Sullivan |
| 5,330,837 A | 7/1994 | Sullivan |
| 5,338,038 A | 8/1994 | Cadorniga |
| 5,338,610 A | 8/1994 | Sullivan |
| 5,359,000 A | 10/1994 | Hamada et al. |
| 5,368,304 A | 11/1994 | Sullivan et al. |
| 5,567,772 A | 10/1996 | Hagman et al. |
| 5,587,430 A | 12/1996 | Talkowski |
| 5,686,689 A | 11/1997 | Snedeker et al. |
| 5,691,418 A | 11/1997 | Hagman et al. |
| 5,810,678 A | 9/1998 | Cavallaro et al. |
| 5,873,796 A | 2/1999 | Cavallaro et al. |
| 5,902,855 A | 5/1999 | Sullivan |
| 5,971,870 A | 10/1999 | Sullivan et al. |
| 5,971,871 A | 10/1999 | Sullivan et al. |
| 5,971,872 A | 10/1999 | Sullivan et al. |
| 5,973,046 A | 10/1999 | Chen et al. |
| 5,976,443 A | 11/1999 | Nesbitt et al. |

(Continued)

FOREIGN PATENT DOCUMENTS

WO    99/48569    9/1999

(Continued)

OTHER PUBLICATIONS

PCT International Search Report for International application No. PCT/US01/25285, dated Dec. 19, 2001.

(Continued)

*Primary Examiner* — David Buttner (57) ABSTRACT

Disclosed are golf balls having soft, resilient bimodal ionomeric covers with improved softness and scuff resistance and methods for their preparation. The soft, resilient bimodal ionomeric covers comprise at least partially neutralized mixtures of carboxylate functionalized terpolymers (molecular weight between about 80,000 and 500,000) with carboxylate functionalized ethylene low copolymers (molecular weight between about 2,000 and 30,000).

17 Claims, 1 Drawing Sheet

U.S. PATENT DOCUMENTS

| | | | |
|---|---|---|---|
| 6,018,003 | A | 1/2000 | Sullivan et al. |
| 6,096,830 | A | 8/2000 | Takemura et al. |
| 6,100,321 | A | 8/2000 | Chen |
| 6,100,340 | A | 8/2000 | Rajagopalan et al. |
| 6,130,294 | A * | 10/2000 | Ichikawa et al. ............. 525/221 |
| 6,562,906 | B2 | 5/2003 | Chen |
| 6,762,246 | B2 | 7/2004 | Chen |
| 7,037,967 | B2 | 5/2006 | Chen |
| 7,273,903 | B2 | 9/2007 | Chen |
| 7,488,778 | B2 | 2/2009 | Chen |
| 2001/0020068 | A1 | 9/2001 | Sullivan |
| 2002/0037968 | A1 | 3/2002 | Chen |
| 2004/0132552 | A1* | 7/2004 | Chen ............................ 473/378 |
| 2004/0209705 | A1 | 10/2004 | Rajagopalan et al. |
| 2005/0203253 | A1 | 9/2005 | Chou et al. |
| 2009/0130355 | A1 | 5/2009 | Chen et al. |
| 2009/0182089 | A1 | 7/2009 | Chen |

FOREIGN PATENT DOCUMENTS

| | | |
|---|---|---|
| WO | 00/23519 | 4/2000 |
| WO | 02/14422 A1 | 2/2002 |
| WO | 2004/029150 A1 | 4/2004 |

OTHER PUBLICATIONS

PCT International Search Report and Written Opinion for International application No. PCT/US2008/083727, dated Apr. 16, 2009.
Office Action dated Sep. 7, 2010 for U.S. Appl. No. 12/313,101.
Office Action dated Apr. 16, 2010 for U.S. Appl. No. 12/313,101.

* cited by examiner

GOLF BALLS WITH SOFT, RESILIENT BIMODAL IONOMERIC COVERS

CROSS-REFERENCES TO RELATED APPLICATIONS

This application is a continuation-in-part application of U.S. application Ser. No. 11/893,831 filed Aug. 17, 2007, and now issued as U.S. Pat. No. 7,488,778; which in turn is a continuation of U.S. application Ser. No. 11/101,078, filed on Apr. 6, 2005, now issued as U.S. Pat. No. 7,273,903; which in turn is a continuation of U.S. application Ser. No. 10/854,725, filed on May 26, 2004, now issued as U.S. Pat. No. 7,037,967; which in turn is a division of U.S. application Ser. No. 10/376,969, filed on Feb. 28, 2003, now issued as U.S. Pat. No. 6,762,246; which in turn is a division of U.S. application Ser. No. 09/924,194, filed on Aug. 8, 2001, now issued as U.S. Pat. No. 6,562,906; which in turn claims priority under 35 U.S.C. §119(e) to U.S. Provisional Appln. No. 60/224,668, filed on Aug. 11, 2000, and to U.S. Provisional Appln. No. 60/279,023, filed on Mar. 27, 2001. Each of these applications is incorporated herein by reference in its entirety.

BACKGROUND OF THE INVENTION

1. Field of the Invention

The present invention relates to golf balls having covers comprising a bimodal ionomeric composition. The bimodal ionomeric cover composition comprises mixtures of carboxylate functionalized terpolymers that are at least partially neutralized.

2. Description of the Related Art

Ionomeric resins (ionomers) are useful materials for the construction of golf balls, among other things. Ionomers are ionic copolymers that are obtained after copolymerization of an olefin such as ethylene with an unsaturated carboxylic acid, such as acrylic acid (AA), methacrylic acid (MAA), or maleic acid, and optionally softening monomers. Neutralizing agents—which for the purposes of this application are ionic compounds containing metal cations such as sodium or zinc ions—are used to neutralize at least some portion of the acidic groups in the copolymer resulting in a thermoplastic resin exhibiting enhanced properties. For example, golf balls constructed using ionomeric materials have improved resilience and durability as compared with balata ball construction. As a result of their resilience, toughness, durability and flight characteristics, various ionomeric resins sold by E. I. DuPont de Nemours & Company under the trademark "Surlyn®" and by the Exxon Corporation under the trademark "Escor®" and the tradename "Iotek" have become materials of choice for the construction of golf balls over the traditional balata (trans polyisoprene, natural or synthetic) rubbers. The softer balata covers, although exhibiting enhanced playability properties, lack the durability necessary for repetitive play. However, the advantages gained in increased durability of the ionomeric covers have been offset to some degree by their decreased playability. This is because the durable ionomeric resins tend to be very hard when used for golf ball cover construction, and thus lack the degree of softness required to impart the spin necessary to control the ball in play.

Current commercial ionomers derived from dipolymers have not been able to produce a satisfactory combination of the desirable properties of the "hard" ionomeric resins, for example, good impact resistance and carrying distance, and the desirable properties of soft balata covers, for example, playability (that is, "spin"). These are properties desired by the more skilled golfer.

Terpolymers made from copolymerization of (a) an olefin, such as ethylene (b) an unsaturated carboxylic acid and (c) other comonomers, such as alkyl acrylates and/or alkyl methacrylates, provide "softer" resins which can be neutralized to form softer ionomers. However, these softer ionomeric resins by themselves are not suitable for golf ball covers because they have reduced resilience and heat stability.

In various attempts to produce a durable, high spin ionomeric golf ball, the golfing industry has blended the hard ionomeric resins with a number of the softer ionomeric resins. U.S. Pat. Nos. 4,884,814 and 5,120,791 are directed to cover compositions containing blends of hard and soft ionomeric resins. The hard copolymers typically are made from an olefin and an unsaturated carboxylic acid. It has been found that golf balls formed from hard-soft ionomer blends tend to become scuffed more readily than covers made of hard ionomer alone. U.S. Pat. No. 5,902,855 is directed to golf balls with scuff resistant covers comprising blends of ionomers with Shore D hardness of about 40-64.

The golfing industry has also developed golf ball covers formed from polyurethane compositions. These covers combine good scuff resistance and a softness that enables spin control and good playability. Because of this combination of desirable factors, golf balls with polyurethane covers are considered to be "premium" balls for the more skilled player. However, polyurethane covers are low in resilience and hence detract from the performance of the golf ball. In addition, thermoset polyurethane covers are more difficult to process than thermoplastic ionomer resins and the material costs are also higher, making polyurethane balls more expensive to manufacture.

Thus, it would be useful to develop a golf ball cover material having a combination of softness, resilience and good scuff resistance with improved heat stability, melt processibility and lower cost. It is also desirable to develop a golf ball having a favorable combination of playability and durability.

SUMMARY OF THE INVENTION

In one aspect, the present invention is a golf ball having a cover, wherein the cover has a scuff resistance no greater than about 3.0 out of 5 and wherein the cover comprises or consists essentially of a thermoplastic composition that includes:
  (a) at least one E/X/Y copolymer having a weight average molecular weight of from about 80,000 to about 500,000 obtained by the copolymerization of comonomers E, X, and Y wherein E is ethylene, X is a $C_3$ to $C_8$ $\alpha,\beta$-ethylenically unsaturated carboxylic acid, and Y is an alkyl acrylate or an alkyl methacrylate softening comonomer wherein the alkyl groups have from 1 to 8 carbon atoms, wherein X is present in an amount of from about 2 to about 30 wt. % of the E/X/Y copolymer, and Y is present in an amount of from about 17 to about 40 wt. % of the E/X/Y copolymer; and
  (b) one or more E/acrylic acid and/or E/methacrylic acid copolymers having a weight average molecular weight of from about 2,000 to about 30,000 and having from about 3 to about 20 wt. % acrylic acid and/or methacrylic acid present based on the weight of (b), the copolymer present in the composition in an amount of from about 5 to about 30 wt. % based on the combined weight of (a)+(b);
and wherein: (1) the thermoplastic composition is at least partially neutralized by at least one neutralizing agent having one or more alkali metal, transition metal, or alkaline earth metal cations; and (2) the composition has a Shore D hardness of less than or equal to about 50 and a flex modulus less than or equal to about 20 kpsi.

In another aspect, the present invention is a golf ball having a cover comprising or consisting essentially of said thermoplastic composition and further comprising at least one additional component selected from copolymers in the group consisting of nonionomeric thermoplastic copolymers and dipolymeric ionomeric thermoplastic copolymers, said copolymers having a weight average molecular weight of from about 80,000 to about 500,000.

In another aspect, the present invention is a process for making a golf ball having a cover that is scuff resistant, the process comprising the steps: forming a cover over a golf ball core, wherein the cover has a scuff resistance of not greater than about 3.0 out of 5 and comprises or consists essentially of a thermoplastic composition that includes:
  (a) at least one E/X/Y copolymer having a weight average molecular weight of from about 80,000 to about 500,000 obtained by the copolymerization of comonomers E, X, and Y wherein E is ethylene, X is a $C_3$ to $C_8$ $\alpha,\beta$-ethylenically unsaturated carboxylic acid, and Y is an alkyl acrylate or an alkyl methacrylate softening comonomer wherein the alkyl groups have from 1 to 8 carbon atoms, wherein E is present in an amount of from about 30 wt % to about 81 wt % based on the weight of the copolymer, X is present in an amount of from about 2 to about 30 wt. % of the copolymer, Y is present in an amount of from about 17 to about 40 wt. % of the copolymer;
  (b) one or more E/acrylic acid and/or E/methacrylic acid copolymers having a weight average molecular weight of from about 2,000 to about 30,000 and having from about 3 to about 20 wt. % acrylic acid and/or methacrylic acid present based on the weight of (b), the copolymer present in the composition in an amount of from about 5 to about 30 wt. % based on the combined weight of (a)+(b);
and wherein: (1) the thermoplastic composition is at least partially neutralized by one or more alkali metal, transition metal, or alkaline earth metal cations and (2) the composition has a Shore D hardness of less than or equal to about 50 and a flex modulus of less than or equal to about 20 kpsi.

In still another aspect, the present invention is a one-piece golf ball having a scuff resistance not greater than about 3.0 out of 5 and comprises or consists essentially of a thermoplastic composition that includes:
  (a) at least one E/X/Y copolymer having a weight average molecular weight of from about 80,000 to about 500,000 obtained by the copolymerization of comonomers E, X, and Y wherein E is ethylene, X is a $C_3$ to $C_8$ $\alpha,\beta$-ethylenically unsaturated carboxylic acid, and Y is an alkyl acrylate or an alkyl methacrylate softening comonomer wherein the alkyl groups have from 1 to 8 carbon atoms, wherein E is present in an amount of from about 30 wt % to about 81 wt % based on the weight of the copolymer, X is present in an amount of from about 2 to about 30 wt. % of the copolymer, Y is present in an amount of from about 17 to about 40 wt. % of the copolymer;
  (b) one or more E/acrylic acid and/or E/methacrylic acid copolymers having a weight average molecular weight of from about 2,000 to about 30,000 and having from about 3 to about 20 wt. % acrylic acid and/or methacrylic acid present based on the weight of (b), the copolymer present in the composition in an amount of from about 5 to about 30 wt. % based on the combined weight of (a)+(b);
and wherein: (1) the thermoplastic composition is at least partially neutralized by one or more alkali metal, transition metal, or alkaline earth metal cations and (2) the composition has a Shore D hardness of less than or equal to about 60 and a flex modulus of less than or equal to about 40 kpsi.

In still another aspect, the present invention is a one-piece golf ball as described hereinabove, further comprising at least one additional copolymer component selected from copolymers in the group consisting of nonionomeric thermoplastic copolymers and dipolymeric ionomeric thermoplastic copolymers, said copolymers having a weight average molecular weight of from about 80,000 to about 500,000.

In another aspect, the present invention is a process for producing a one-piece golf ball as described herein, comprising the step: molding a composition of the present invention into the shape of a golf ball.

DETAILED DESCRIPTION OF THE INVENTION

All references disclosed herein are incorporated by reference.

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

"Bimodal ionomers" means ionomers with high terpolymer components and low copolymer components wherein the Mw of the high terpolymer and the Mw of the low copolymer are sufficiently different that two distinct molecular weight peaks can be observed when measuring Mw of the blend by gel permeation chromatography (GPC) with a high-resolution column.

"Ethylene/(meth)acrylic acid (also abbreviated as E/(M)AA)" means "ethylene/acrylic acid copolymers and/or ethylene/methacrylic acid copolymers."

According to the present invention the soft, resilient thermoplastic compositions described herein provide an improved balance of properties and processibility. The thermoplastic compositions are "bimodal" ionomers that are at least partially neutralized and are derived from blends of high molecular weight terpolymers (high terpolymers) and low molecular weight copolymers (low copolymers). That is to say, they are melt-blends of: (1) terpolymers having a weight average molecular weight (Mw) of about 80,000 to about 500,000 obtained by the copolymerization of (a) ethylene, (b) $\alpha,\beta$-ethylenically unsaturated $C_{3-8}$ carboxylic acids and (c) softening comonomers selected from alkyl acrylate and alkyl methacrylate with a weight average molecular weight (Mw) of about 80,000 to about 500,000; and (2) low copolymers having a Mw of from about 2,000 to about 30,000, obtained by copolymerization of ethylene with $\alpha,\beta$-ethylenically unsaturated $C_{3-8}$ carboxylic acids and are at least partially neutralized according to methods well known in the art by one or more alkali metal, transition metal, or alkaline earth metal cations. Particularly preferred low copolymers are copolymers of E/(M)AA, and most preferred low copolymers are the low dipolymers.

The high terpolymers can be blends of high terpolymers and the low copolymers can be blends of low copolymers. The ionomers derived from high terpolymers can also be referred to as soft resilient ionomers (SRI), and are characterized by an Atti Compression and a Coefficient of Restitution (COR) that each independently falls within the area that is defined by the vertices $A_1$, $A_2$, and N [hereinafter designated $A_1$-$A_2$-N] of FIG. 1.

It has been found that, by proper selection of the low copolymer the thermoplastic compositions of this invention have demonstrated both enhanced melt processability, enhanced resilience, enhanced heat stability and enhanced scuff resistance. This combination of the property enhancements is contrasted to the reduction in heat stability that would be expected with higher melt flows. These unique soft, resilient bimodal ionomer compositions are highly useful for injection molding applications, including production of golf ball covers and golf balls comprising such covers.

According to this invention, the weight percent (wt. %) of the high terpolymer is from about 70 to about 97 wt. %, preferably from about 80 to about 95 wt. %, and the weight percent of the low copolymer is from about 3 to about 30%, preferably from about 5 to about 20 wt. %. Weight percentage is based on the total combined weight of the high terpolymer and the low copolymer. Preferably at least 30%, and more preferably at least 45%, of the acid moieties are neutralized by neutralizing agents having cations of at least one alkali metal, alkaline earth metal, or transition metal. A composition of this mixture has a Shore D hardness of less than or equal to 50, preferably from about 10 to about 45, and more preferably from about 15 to about 40, and a flex modulus of less than or equal to 20 kpsi.

The soft, resilient bimodal ionomer compositions described above, or blends thereof with nonionomeric thermoplastic copolymers and/or with dipolymeric ionomeric thermoplastic copolymers having a $M_w$ of about 80,000 to about 500,000, can be processed in molding applications for golf ball applications such as the cover of 2-, 3- or multiple-piece golf balls, and as thermoplastic 1-piece balls.

In accordance with this invention, the Mw of the high terpolymers is separated from the Mw of the low copolymers sufficiently that the peaks for the high copolymers are distinctly separated from the peaks for the low copolymers when the blend molecular weight distribution is determined by GPC with a high-resolution column. Preferably, to obtain sufficient molecular weight separation in the blends of the present invention, high terpolymers having Mw's that are lower in the high terpolymer molecular weight range are blended with low copolymers having Mw's that are lower in the low copolymer molecular weight range (for example, high terpolymers having a Mw of about 80,000 with low copolymers having a Mw of about 2,000). This becomes less important as the Mw's of the high terpolymers increase.

Preferably the low copolymers are present in the range of from about 5 to about 30 weight percent based on the combined weight of the high copolymers and the low copolymers in the blend.

Preferably the high terpolymers and low copolymers are at least partially neutralized by at least one of the alkali metal, alkaline earth metal or transition metal cations. Preferably at least 30%, more preferably at least 45%, even more preferably at least 50%, and most preferably at least 60% of the total number of acid moieties in the high copolymers and low copolymers are neutralized. Cations are selected from the group consisting of lithium*, sodium*, potassium, magnesium*, calcium, barium, lead, tin, or zinc* (* indicates a preferred cation), or a combination of such cations. More preferred cations are lithium, magnesium and zinc, with zinc especially preferred.

Neutralization can be effected by first making the high terpolymer and/or the low dipolymer and treating the polymer (s) with inorganic base(s) with alkali metal, alkaline earth metal or transition metal cation(s). Methods for preparing ionomers from copolymers are well known in the art. The resulting ionomer(s) can be melt-blended with other ionomers or polymers. To achieve desired higher neutralization the resulting blend of ionomers can be further neutralized. Preferably the high terpolymers and low copolymers are melt-blended and then neutralized in situ so that the desired level of neutralization can be achieved in one step.

Optionally, the composition can include up to 100 parts by weight of organic acid salts, up to 200 parts by weight thermoplastic elastomers, up to 170 parts by weight fillers and up to 50 parts of additional high molecular weight dipolymer (e.g. nonionomeric thermoplastic copolymers and/or dipolymeric ionomeric thermoplastic copolymers having a $M_w$ of from about 80,000 to about 500,000) based on 100 parts by weight of the of the soft, resilient bimodal ionomer of the high terpolymer/low copolymer blend. Other additives such as stabilizers and processing aids can be included.

The components of the blends useful in this invention are more fully described below.

High Terpolymers

The high terpolymers useful in this invention are preferably 'direct' acid copolymers (as opposed to grafted copolymers) having an Mw of from about 80,000 to about 500,000. Preferably they have polydispersities (Mw/Mn) of about 1 to about 15.

Terpolymers of the present invention are preferably obtained by copolymerization of (a) an alpha olefin (b) a $C_{3-8}$ α,β-ethylenically unsaturated carboxylic acid and (c) a softening monomer. By "softening", it is meant that the polymer is made less crystalline. Suitable "softening" comonomers are monomers selected from alkyl acrylate and alkyl methacrylate, wherein the alkyl groups have from 1 to 12 carbon atoms, and vinyl acetate.

The ethylene acid copolymers can be described as E/X/Y copolymers where E is ethylene, X is the α,β-ethylenically unsaturated carboxylic acid, and Y is a softening comonomer. X is present in an amount ranging from about 2 to about 20 (preferably from about 5 to about 15, and most preferably from about 5 to about 13) wt. % of the polymer, and Y is present in an amount which ranges from about 17 to about 40 wt. % of the E/X/Y copolymer (preferably from about 20 to about 35) wt. % of the polymer. The high terpolymers useful in this invention have an Atti (PGA) Compression and a COR that each, independently, fall within area $A_1$-$A_2$-N, $B_1$-$B_2$-N, $C_1$-$C_2$-N, $D_1$-$D_2$-N, or even area $E_1$-$E_2$-N of FIG. 1. Preferably, the Atti Compression and Coefficient of Restitution each independently fall within area $B_1$-$B_2$-N of FIG. 1, more preferably within area $C_1$-$C_2$-N of FIG. 1 and even more preferably within area $D_1$-$D_2$-N of FIG. 1. Most preferably, the Atti Compression and Coefficient of Restitution each independently fall within $E_1$-$E_2$-N of FIG. 1. Atti Compressions and Coefficients of Restitution that fall on the noted lines are considered to be within a specified area for purposed of the present invention. By way of non-limiting explanation as to what is intended by Atti Compression and a Coefficient of Restitution that each independently fall within the area $A_1$-$A_2$-N, reference is made to FIG. 1. It would be within the scope of this invention to use a terpolymer with an Atti Compression of 40 and a COR of 0.700 for the neat resin spheres, as well as a terpolymer having an Atti Compression of 40 and a COR of 0.650. It would also be within the scope of this invention to use a terpolymer with an Atti compression of 2 and a COR of 0.564 for the neat resin spheres.

The ethylene acid copolymers with high levels of acid (X) are difficult to prepare in continuous polymerizers because of monomer-polymer phase separation. This difficulty can be avoided however by use of "co-solvent technology" as described in U.S. Pat. No. 5,028,674 which is incorporated herein by reference or by employing somewhat higher pressures than those at which copolymers with lower acid can be prepared.

Figure 1:
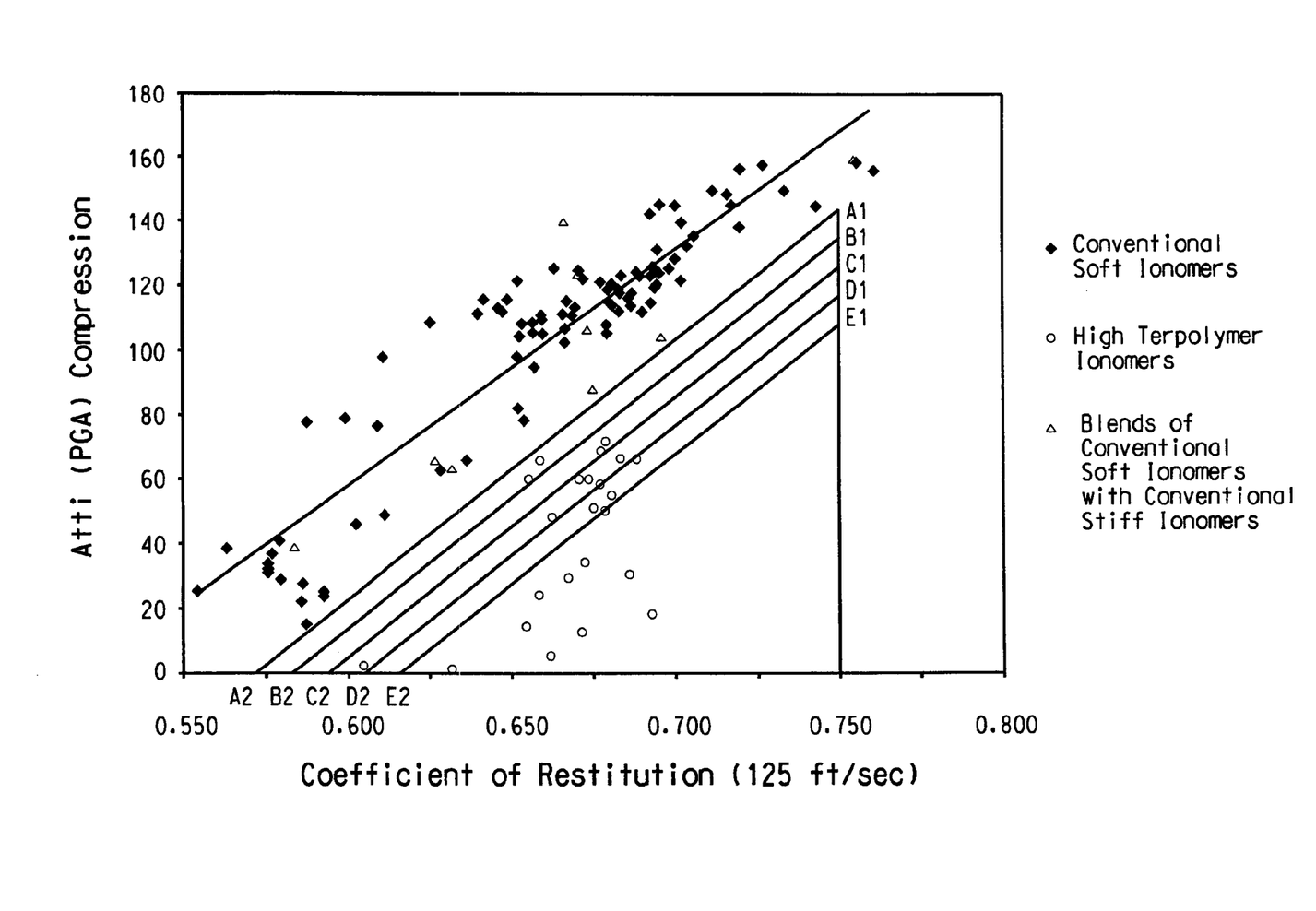
FIG. 1 is a plot of Atti (PGA) compression versus COR (125 ft/sec initial velocity) showing the properties of molded spheres of high terpolymer ionomer resins useful in the present invention as compared with other conventional ionomer resins.

Of particular note are high terpolymers comprising ethylene, 6.2 wt. % of acrylic acid and 28 wt. % of n-butylacrylate with a melt index of 200 [hereinafter, specific blends can be referred to using a generic format E/wt % X/wt % Y, wherein the wt % of component X and the wt % of component Y are indicated. A specific measured property, for example the melt index (MI), can be specified in the generic formula as well. For example, the blend above can be described as E/6.2AA/28nBA(200MI)]. These terpolymers may be prepared by using "co-solvent technology" as described in U.S. Pat. No. 5,028,674. These terpolymers can be converted to ionomers suitable for use herein. FIG. 1 shows a plot of Atti compression (see below) versus Coefficient of Restitution at 125 ft/sec initial velocity (COR-125) of molded, neat resin spheres showing the properties of spheres of these high terpolymer resins compared to spheres of other resins. By inspection of FIG. 1, it can be observed that these copolymers have Atti Compression and a Coefficient of Restitution values that each independently fall within the area $A_1$-$A_2$-N in FIG. 1.

Low Copolymers

The low copolymers useful in this invention are preferably 'direct' acid copolymers having an Mw of from about 2,000 to about 30,000. Preferably they have polydispersities (Mw/Mn) of about 1 to about 10. They are copolymers that are preferably obtained from copolymerization of an alpha olefin, preferably ethylene and a $C_{3-8}$ α,β-ethylenically unsaturated carboxylic acid, preferably acrylic and/or methacrylic acid. Preferably the acid moiety in these copolymers is present in a range of from about 3 to about 20 (preferably from about 3 to about 15, and most preferably from about 5 to about 10) wt. % of the polymer.

Often these low copolymers are referred to as acid copolymer waxes and are commercially available from Honeywell (examples are indicated in Table 1 with their molecular weights).

TABLE 1

| | Composition/MI | Mn ($10^3$) | Mw ($10^3$) | Polydispersity (Mw/Mn) |
|---|---|---|---|---|
| AC540 | E/5AA/575 cps Brookfield @ 140 C. ** | 4.3 | 7.5 | 1.7 |
| AC580 | E/10AA/650 cps Brookfield @ 140 C. ** | 4.8 | 26.0 | 5.4 |
| AC5120 | E/15AA/650 cps Brookfield @ 140 C. ** | 3.0 | 5.2 | 1.7 |

** No MI data available; Brookfield data defined by Honeywell or formerly Allied Signal Ionomers Ionomers of the high terpolymers and of the low copolymers when made separately can be made by methods well known in the art. For example, U.S. Pat. No. 3,264,272 describes a process for making ionomers suitable for use in the practice of the present invention. The degree of neutralization and the acid level should be selected so that the resulting ionomers of the high terpolymers and the ionomers of the low copolymers remain melt-processable and meet the indicated performance standards.

The soft, resilient bimodal ionomers of high terpolymer/low copolymer blends can be made by melt blending the melt processable ionomers separately made and then optionally further neutralizing with the same or different cations to achieve desired levels of neutralization of the resulting blend of ionomers. Preferably the non-neutralized high terpolymers and low copolymers are melt-blended and then neutralized in situ. In this case the desired level of neutralization can be achieved in one step.

Preferably the acid moieties in the resulting bi-modal ionomer of the high copolymers and low copolymers are at least partially neutralized to a level of at least 30%, alternatively at least 45%, alternatively at least 50%, alternatively at least 60%.

Thermoplastic Resins

As indicated above, the soft, resilient bimodal compositions described above may also be blended with additional nonionomeric thermoplastic copolymers and/or dipolymeric ionomeric thermoplastic copolymers with a weight average molecular weight of from about 80,000 to about 500,000. The additional thermoplastic polymer components can be selected from among copolyetheresters, copolyetheramides, elastomeric polyolefins, styrene diene block copolymers and thermoplastic polyurethanes, these classes of polymers being well known in the art.

The nonionic thermoplastic resins include, by way of non-limiting illustrative examples, thermoplastic elastomers, such as polyurethane, polyether-ester, poly-amide-ether, polyether-urea, PEBAX (a family of block copolymers based on polyether-block-amide, commercially supplied by Atochem), styrene-butadiene-styrene (SBS) block copolymers, styrene(ethylene-butylene)-styrene block copolymers, etc., polyamide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride, epoxidization etc., either by copolymerization or by grafting, elastomers such as EPDM, metallocene catalyzed PE and copolymer, ground up powders of the thermoset elastomers, etc.

Ionomeric copolymers can be blended with the soft, resilient bimodal resin, using well-known techniques, to produce products having desirable properties, including lower hardness and higher resilience as compared with blends of conventional ionomers. Non-limiting, illustrative examples of suitable ionomers include E/15MAA/Na, E/19MAA/Na, E/15AA/Na, E/19AA/Na, E/15MAA/Mg and E/19MAA/Li, wherein the metal cation used is indicated at the end of the abbreviated copolymer composition name. These ionomeric blends are considered to be within the scope of the present invention to the extent that they exhibit the defined performance characteristics of this invention.

The copolyetheresters are discussed in detail in patents such as U.S. Pat. Nos. 3,651,014; 3,766,146; and 3,763,109. Preferred copolyetherester polymers are those where the polyether segment is obtained by polymerization of tetrahydrofuran and the polyester segment is obtained by polymerization of tetramethylene glycol and phthalic acid. The more polyether units incorporated into the copolyetherester, the softer the polymer.

The copolyetheramides are also well known in the art as described in U.S. Pat. No. 4,331,786, for example. They are comprised of a linear and regular chain of rigid polyamide segments and flexible polyether segments.

The elastomeric polyolefins are polymers composed of ethylene and higher primary olefins such as propylene, hexene, octene and optionally 1,4-hexadiene and or ethylidene norbornene or norbornadiene. The elastomeric polyolefins can be functionalized with maleic anhydride.

Thermoplastic polyurethanes are linear or slightly chain-branched polymers consisting of hard blocks and soft elastomeric blocks. They are produced by reacting soft hydroxy-terminated elastomeric polyethers or polyesters with diisocyanates such as methylene diisocyanate (MDI) or toluene diisocyanate (TDI). These polymers can be chain extended with glycols, diamines, diacids, or aminoalcohols. The reaction products of the isocyanates and the alcohols are called urethanes and these blocks are relatively hard and high-melting. These hard, high-melting blocks are responsible for the thermoplastic nature of the polyurethanes.

Block styrene diene copolymers are composed of polystyrene units and polydiene units. The polydiene units are derived from polybutadiene, polyisoprene units or copolymers of these two. In the case of the copolymer it is possible to hydrogenate the polyolefin to give saturated rubbery backbone segments. These materials are usually referred to as SBS, SIS or SEBS thermoplastic elastomers and they can also be functionalized with maleic anhydride.

Other polymers that can be blended with the "soft, resilient bimodal" composition described above include LDPE, LLDPE, mPE, EPDM, E/P copolymers, Ethylene copolymers containing at least one of the group consisting of VA, nBA, CO, GMA, MA, EA, and the MAN grafted copolymers.

Fillers

An optional filler component of the subject invention is chosen to impart additional density to the soft, resilient bimodal ionomers or blends thereof with other materials. Preferred densities for golf balls include densities in the range starting with the density of unfilled polymer to 1.8 gm/cc. Generally, the filler will be inorganic, having a density greater than about 4 gm/cc, preferably greater than 5 gm/cc, and will be present in amounts between 0 and about 60 wt. % based on the total weight of the composition. Examples of useful fillers include zinc oxide, barium sulfate, lead silicate and tungsten carbide, tin oxide, as well as the other well known corresponding salts and oxides thereof. It is preferred that the filler materials be non-reactive or almost non-reactive with the polymer components described above when the ionomers are less than completely neutralized. If the ionomers are fully neutralized, reactive fillers may be used. Zinc Oxide grades, such as Zinc Oxide, grade XX503R available from Zinc Corporation of America, that do not react with any free acid to cause cross-linking and a drop in MI are preferred, particularly when the ionomer is not fully neutralized.

Other Components

Other optional additives include titanium dioxide, which is used as a whitening agent or filler; other pigments, optical brighteners; surfactants; processing aids; etc.

Uses of the Soft, Resilient Bimodal Ionomer Composition in Golf Balls

The soft, resilient bimodal ionomers described herein are useful substitutions for one or more materials taught in the art at the levels taught in the art for use in covers of golf balls, or one-piece golf balls. See, for example, U.S. Pat. Nos. 4,274, 637; 4,264,075; 4,323,247; 4,337,947, 4,398,000; 4,526,375; 4,567,219; 4,674,751; 4,884,814; 4,911,451; 4,984,804; 4,986,545; 5,000,459; 5,068,151; 5,098,105; 5,120,791; 5,155,157; 5,197,740; 5,222,739; 5,253,871; 5,298,571; 5,321,089; 5,328,959; 5,330,837; 5,338,038; 5,338,610; 5,359,000; 5,368,304; 5,567,772; 5,757,483; 5,810,678; 5,873,796; 5,902,855; 5,971,870; 5,971,871; 5,971,872; 5,973,046; 5,976,443; 6,018,003; 6,096,830; and PCT Patent Application Publication WO 99/48569.

Golf balls prepared in accordance with this invention comprise a cover made from the soft, resilient bimodal ionomer described herein replacing any traditional golf ball cover material such as Surlyn® ionomer resin, balata rubber or thermoset/thermoplastic polyurethanes and the like. Said golf balls will have a traditional dimple pattern and may be coated with a polyurethane coating or be painted for appearance purposes, but such a coating and/or painting will not affect the performance characteristics of the ball. However, coating and/or painting may affect the scuff resistance of the ball. In particular, such coating and/or painting may improve scuff resistance over that of an unfinished ball. For the purposes of this invention, any coating and/or painting are not considered to be part of a golf ball cover.

Two-Piece Golf Ball

As used herein, the term "two-piece ball" refers to a golf ball comprising a core and a cover. These two-piece balls are manufactured by first molding the core from a thermoset or thermoplastic composition, positioning these preformed cores in injection molding cavities using retractable pins, then injection molding the cover material around the cores. Alternatively, covers can be produced by compression molding cover material over the cores. The soft, resilient bimodal ionomer described herein can be used as the cover of such golf balls to prepare a golf ball of this invention.

Three-Piece Golf Ball

As used herein, the term "three-piece ball" refers to a golf ball comprising a center, a traditional elastomeric winding wound around the center, and a cover. Three-piece golf balls are manufactured by well known techniques as described in, for example, U.S. Pat. No. 4,846,910. The soft, resilient bimodal ionomer described herein can be used as the cover of such golf balls to prepare a golf ball of this invention.

Multi-Layer Golf Ball

As used herein, the term "multi-layer ball" refers to a golf ball comprising a core, a cover, and one or more mantles between the core and the cover. These multi-layer balls are manufactured by first molding or making the core, typically compression or injection molding the mantle(s) over the core and then compression or injection molding a cover over the mantle. The soft, resilient bimodal ionomer described herein can be used as the cover of such golf balls to prepare a golf ball of this invention.

As indicated above, golf ball cores may be solid or wound. Solid cores may be molded in one piece using compression or injection molding techniques. A wound core is generally produced by winding a very large elastic thread around a solid or liquid-filled balloon center. As indicated, additional mantle layers may be applied over the core to produce a multi-layer ball. Since the core material is not an integral part of the present invention, a detailed description of specific types of core materials that may be used with the cover compositions of the present invention are not specifically set forth herein. For the purposes of this invention, the term core includes solid or wound cores and also includes any mantle layers present in multi-layer balls.

One-Piece Golf Ball

As used herein, the term "one-piece ball" refers to a golf ball molded in toto from a thermoplastic composition, i.e., not having elastomeric windings, cores or mantles and in which the "cover" is a homogeneous solid spheroid. The one-piece molded ball will have a traditional dimple pattern and may be coated with a urethane lacquer or be painted for appearance purposes, but such a coating and/or painting will not affect the performance characteristics of the ball. These one-piece balls are manufactured by direct injection molding techniques or by compression molding techniques. The soft, resilient bimodal ionomer described herein is used in such balls in combination with other materials typically used in these balls to prepare a golf ball of this invention.

Covers for golf balls comprising the soft, resilient bimodal ionomer described herein, or blends thereof with other ionomers or non-ionomeric thermoplastic resins, are included in this invention. The covers can be made by injection or compression molding the soft, resilient bimodal ionomer described above (with or without organic acid or filler, other components, and other thermoplastics including other ionomers) over a thermoplastic or thermoset core of a two-piece golf ball, over windings around a thermoplastic or thermoset center, or over the intermediate mantle layers of a multi-layer golf ball.

The specific combinations of resilience and compression used in the practice of the subject invention will in large part be dependent upon the type of golf ball desired (e.g., one-piece, two-piece, three-piece, or multi-layered), and in the type of performance desired for the resulting golf ball as detailed below. In addition, a golf ball must meet the mass limit (45 grams) set by the United States Golfing Association (U.S.G.A.). Preferably, the ball has a density of about 1.14 gm/cc. In two-piece, three-piece or multi-layer balls, fillers as described above may be added to the cores, mantles and/or covers as required to provide golf balls meeting the mass limit. Depending on the composition(s) of the other pieces of the ball, covers of this invention can be prepared from the soft, resilient bimodal ionomer compositions described herein modified with filler(s) as described above to meet the mass limit.

Of note are one-piece balls in which the soft, resilient bimodal ionomer is modified with fillers as described above to provide a golf ball meeting the mass limit (45 grams) set by the U.S.G.A. Preferably, enough filler is used so that the ball has a density 1.14 gm/cc. The present invention includes one-piece balls comprising a composition having a Shore D hardness less than or equal to 60 and a flex modulus less than or equal to 40 kpsi. Preferred are one-piece balls comprising a composition having a Shore D hardness of from about 10 to about 55; more preferred are one-piece balls comprising a composition having a Shore D hardness of from about 15 to about 50.

The golf balls of the present invention can be produced by molding processes that include but are not limited to those which are currently well known in the golf ball art. For example, the golf balls can be produced by injection molding or compression molding the novel cover compositions described herein around a wound or solid molded core to produce a golf ball having a diameter of about 1.680-1.800 inches and typically but not necessarily having a mass of about 45 g.

As indicated, the golf balls of this invention can be produced by forming covers comprising the soft, resilient bimodal ionomer compositions around cores by molding processes. For example, in compression molding, the cover composition is formed via injection at, for example, about 380° F. to about 450° F. into smooth hemispherical shells which are positioned around the core in a dimpled golf ball mold and subjected to compression molding at, for example, 200-300° F. for about 2 to about 10 minutes, followed by cooling at 50-70° F. for about 2 to about 10 minutes, to fuse the shells together to form a unitary ball. In one type of injection molding, the cover composition is injected directly around the core placed in the center of a golf ball mold for a period of time at a mold temperature from about 50° F. to about 100° F.

One-piece balls may be prepared by similar injection molding methods, except that a core is not present in the golf ball mold during the molding process.

After molding, the golf balls produced may undergo various further processing steps such as buffing, painting and marking.

Without further elaboration, it is believed that one skilled in the art using the preceding description can utilize the present invention to its fullest extent. The following Examples are, therefore, to be construed as merely illustrative, and not limiting of the disclosure in any way whatsoever.

EXAMPLES AND COMPARATIVE EXAMPLES

Examples 1-13 and Comparative Examples 14-15

A master blend of 90 parts by weight of E/6.2AA/28nBA (200MI) high terpolymer and 10 parts by weight of E/5AA (AC[[?]]540) low copolymer was prepared using standard blending techniques.

Portions of the master blend were neutralized on a single screw extruder with a series of neutralizing agents at various loadings, i.e. ZnO concentrate for Example 1 through 3, LiOH concentrate for Example 4 through 7, $Na_2CO_3$ concentrate for Example 8 through 10, and $Mg(OH)_2$ concentrate for Example 1 through 13 to produce soft and resilient bimodal ionomers. The cation contents were determined by elemental analysis and the melt indices were determined by standard techniques and are reported in Table 2.

TABLE 2

| Ex. Composition Master Blend | Ion type (wt %) | MI (ESL) |
|---|---|---|
| 1 90% E/6.2AA/28nBA200MI:10% E/5AA | Zn (2.08%) | 0.42 |
| 2 90% E/6.2AA/28nBA200MI:10% E/5AA | Zn (1.67%) | 1.1 |
| 3 90% E/6.2AA/28nBA200MI:10% E/5AA | Zn (1.36%) | 2.2 |
| 4 90% E/6.2AA/28nBA200MI:10% E/5AA | Li (0.48%) | 1.9 |
| 5 90% E/6.2AA/28nBA200MI:10% E/5AA | Li (0.47%) | 3.0 |
| 6 90% E/6.2AA/28nBA200MI:10% E/5AA | Li (0.47%) | 3.6 |
| 7 90% E/6.2AA/28nBA200MI:10% E/5AA | Li (0.39%) | 8.9 |
| 8 90% E/6.2AA/28nBA200MI:10% E/5AA | Na (1.98%) | 1.2 |
| 9 90% E/6.2AA/28nBA200MI:10% E/5AA | Na (1.58%) | 2.0 |
| 10 90% E/6.2AA/28nBA200MI:10% E/5AA | Na (1.41%) | 4.0 |
| 11 90% E/6.2AA/28nBA200MI:10% E/5AA | Mg (2.80%) | 1.8 |
| 12 90% E/6.2AA/28nBA200MI:10% E/5AA | Mg (1.94%) | 3.1 |
| 13 90% E/6.2AA/28nBA200MI:10% E/5AA | Mg (1.49%) | 6.6 |

The soft and resilient bimodal ionomer compositions prepared as Examples 1 through 13 were injection molded into flex bars for mechanical property tests. After two weeks of annealing at ambient temperature (approximately 20 to 22° C.), the Shore D hardness at 10 seconds and the flex moduli were measured and are reported in Table 3. The soft and resilient bimodal ionomers were also injection molded into resin spheres and tested for golf ball properties after more than two weeks of aging at ambient temperature. The Atti compressions and the coefficients of restitution of the neat spheres are reported in Table 3.

TABLE 3

| | Injection-molded Testpiece | | Neat Sphere Properties | |
|---|---|---|---|---|
| Example | Shore D (10 sec.) | Flex Modulus (kpsi) | Atti Compression | COR-125 |
| 1 | 35 | 4.69 | 52 | 0.629 |
| 2 | 34 | 3.97 | 40 | 0.595 |

TABLE 3-continued

| | Injection-molded Testpiece | | Neat Sphere Properties | |
|---|---|---|---|---|
| Example | Shore D (10 sec.) | Flex Modulus (kpsi) | Atti Compression | COR-125 |
| 3 | 31 | 3.59 | 27 | 0.573 |
| 4 | 40 | 6.14 | 71 | 0.682 |
| 5 | 38.5 | 5.29 | 67 | 0.677 |
| 6 | 36.5 | 5.45 | 72 | 0.669 |
| 7 | 30.3 | 4.00 | 49 | 0.636 |
| 8 | 34.5 | 4.60 | 73 | 0.678 |
| 9 | 34 | 3.77 | 67 | 0.673 |
| 10 | 30.5 | 3.72 | 56 | 0.660 |
| 11 | 38.8 | 7.01 | 60 | 0.677 |
| 12 | 37.8 | 5.87 | 55 | 0.666 |
| 13 | 35 | 4.38 | 44 | 0.639 |

Preferred compositions are those exhibiting Shore D hardness of from about 30 to about 40 and flex moduli from about 3 to about 8 kpsi.

The soft and resilient bimodal ionomers of Examples 1 through 13 were also injection molded as the cover layer over a commercial thermoset polybutadiene golf ball core to prepare golf balls of this invention. The 2-piece golf balls were tested for scuff resistance after two weeks of aging at room temperature. The scuff ratings of the unpainted and otherwise unfinished 2-piece golf balls of this invention are given in Table 4. The commercial polyurethane (PU) covered golf balls, i.e. Titleist's ProV-1 and Nike's Accuracy (Comparative Examples 14 and 15 respectively), were also tested for relative scuff resistance, and the test results reported in Table 3 for comparison. The commercial Comparative Examples are painted and/or fully finished for play. The unpainted 2-piece balls of this invention, with covers prepared from the soft and resilient bimodal ionomers described above demonstrated superior scuff resistance and improved resilience and soft feel, i.e. lower hardness and stiffness.

TABLE 4

| Example | Golf Ball with Cover Prepared from Example | Scuff Resistance |
|---|---|---|
| | Ionomer (Unfinished) | |
| 1 | 2-piece ball over polybutadiene core | 1 |
| 2 | 2-piece ball over polybutadiene core | 0.5 |
| 3 | 2-piece ball over polybutadiene core | 0.5 |
| 4 | 2-piece ball over polybutadiene core | 1.5 |
| 5 | 2-piece ball over polybutadiene core | 2 |
| 6 | 2-piece ball over polybutadiene core | 2 |
| 7 | 2-piece ball over polybutadiene core | 1 |
| 8 | 2-piece ball over polybutadiene core | 2.5 |
| 9 | 2-piece ball over polybutadiene core | 2.75 |
| 10 | 2-piece ball over polybutadiene core | 3 |
| 11 | 2-piece ball over polybutadiene core | 1.5 |
| 12 | 2-piece ball over polybutadiene core | 1.5 |
| 13 | 2-piece ball over polybutadiene core | 1 |
| | Commercial Standard Finished Ball | |
| Comp. 14 | Commercial Titleist ProV-1 (TS PU cover) | 3.5 |
| Comp. 15 | Commercial Nike Accuracy (TP PU cover) | 2.2 |

Testing Criteria for Examples

Melt Index (MI) was measured in accord with ASTM D-1238, condition E, at 190° C., using a 2160-gram weight, with values of MI reported in grams/10 minutes.

Shore D hardness was determined in accord with ASTM D-2240.

COR is measured by firing an injection-molded neat sphere of the resin having the size of a golf ball from an air cannon at a velocity determined by the air pressure. The sphere strikes a steel plate positioned three feet away from the point where initial velocity is determined, and rebounds through a speed-monitoring device located at the same point as the initial velocity measurement. The return velocity divided by the initial velocity is the COR. The initial velocity generally employed is 125 feet/second (COR-125).

Atti Compression (also known as PGA Compression) is defined as the resistance to deformation of a golf ball, measured using an Atti Compression Gauge. The Atti Compression Gauge is designed to measure the resistance to deformation or resistance to compression of golf balls that are 1.680 inches in diameter. In these examples, smaller spheres of approximately 1.53 inches in diameter were used. Spacers or shims were used to compensate for this difference in diameter. The sphere diameters were measured. A shim thickness was calculated such that the sphere diameter plus shim thickness equaled 1.680 inches. Then the PGA compression of the sphere and shim was measured. A set of shims of different thicknesses was used to correct the sphere diameter plus shim thickness to within 0.0025 inches of 1.680 inches. After the PGA compression measurement was made, the value was mathematically corrected to compensate for any deviation from 1.680 inches. If the sphere diameter plus shim thickness was less than 1.680 inches, one compression unit was added for every 0.001 inch less than 1.680 inches. If the sphere diameter plus shim thickness was greater than 1.680 inches, one compression unit was subtracted for every 0.001 inch greater than 1.680 inches.

Scuff resistance was determined in the following manner: a D-2 tool steel plate machined to simulate a sharp grooved pitching wedge with square grooves was obtained and was mounted on a swing arm that swings in a horizontal plane. The simulated club face was oriented for a hit on a golf ball at a 54° angle. The machine was operated at a club head speed of 140 feet per second. Balls were prepared as described above from each of the test compositions. Comparison balls with polyurethane covers were obtained commercially. At least three balls of each composition were tested and each ball was hit once. After testing, the balls were rated according to the following criteria (see Table 5). Scuff damage was characterized by the presence of indented lines, lifts or groove bands. Indented lines are visible lines created by permanent displacement of the resin, but without cutting, breaking or discontinuity of the surface. Lifts are scuffs in which the resin is displaced enough that the surface is broken such that a portion of the resin is separated from the bulk of the ball. Severe lifts include flaps, whiskers or strands. Groove bands are bands of resin missing from the bulk of the ball corresponding in dimension to a single groove of the club face. The ratings were assigned numerical values based on the criteria in Table 5.

TABLE 5

| | |
|---|---|
| 0 | No sign of impact |
| 1 | One or more indented lines on a ball, but no separation of resin from the bulk of the ball. |
| 2 | One or more lifts on a ball. Resin separated from the ball on one edge but still firmly attached. |
| 3 | Severe lifts and whiskers. Flaps and strands of resin separated from the bulk of the ball but generally still attached. |
| 4 | One or more groove bands, but undamaged resin between groove bands. |
| 5 | Material missing entirely between two or more grooves bands. |

Decimal fraction ratings can be assigned between these descriptions. For example, barely visible indented lines may be rated 1.0 while deeply indented lines that push up ridges of the resin may be rated 1.8. One lift may be rated 2.0 while three or four lifts may be rated 2.5. A ball rated 3 may look more damaged than a ball rated 4 or 5 because missing material may be less noticeable than flaps and/or whiskers.

Golf balls of this invention have a scuff resistance less than or equal to 3.0 according to this rating system. More preferably, golf balls of this invention have a scuff resistance less than or equal to 2.5 and even more preferably a scuff resistance less than or equal to 2.0.

What is claimed is:

1. A golf ball having a cover, wherein the cover comprises a thermoplastic composition that includes:
   (a) at least one E/X/Y copolymer having a weight average molecular weight ($M_w$) of from about 80,000 to about 500,000 obtained by the copolymerization of comonomers E, X, and Y wherein E is ethylene, X is a $C_3$ to $C_8$ $\alpha,\beta$-ethylenically unsaturated carboxylic acid, and Y is an alkyl acrylate or an alkyl methacrylate softening comonomer wherein the alkyl groups have from 1 to 8 carbon atoms, wherein X is present in an amount of from about 2 to about 30 wt. % of the E/X/Y copolymer, and Y is present in an amount of from about 17 to about 35 wt. % of the E/X/Y copolymer;
   (b) one or more E/acrylic acid and/or E/methacrylic acid copolymers having a weight average molecular weight of from about 2,000 to about 30,000 and having from about 3 to about 20 wt. % acrylic acid and/or methacrylic acid present based on the weight of (b), the copolymer present in the composition in an amount of from about 5 to about 30 wt. % based on the combined weight of (a)+(b);
   and wherein the thermoplastic composition is at least partially neutralized by one or more alkali metal, transition metal, or alkaline earth metal ionic.

2. The golf ball of claim 1 wherein at least 30% of the acid moieties of the composition are neutralized.

3. The golf ball of claim 2 wherein at least 45% of the acid moieties of the composition are neutralized.

4. The golf ball of claim 1 wherein the neutralizing agent has a cation selected from the group consisting of zinc, magnesium and lithium.

5. The golf ball of claim 4 wherein the neutralizing agent has a zinc cation.

6. The golf ball of claim 1 wherein the cover further comprises at least one thermoplastic polymer selected from the group consisting of copolyetheresters, copolyetheramides, elastomeric polyolefins, styrene diene block copolymers and thermoplastic.

7. The golf ball of claim 6 wherein at least 30% of the acid moieties of the composition are neutralized.

8. The golf ball of claim 7 wherein at least 45% of the acid moieties of the composition are neutralized.

9. The golf ball of claim 6 wherein the neutralizing agent has a cation selected from the group consisting of zinc, magnesium and lithium.

10. The golf ball of claim 8 wherein the neutralizing agent has a zinc cation.

11. A one-piece golf ball comprising a thermoplastic composition that includes:
    (a) at least one E/X/Y copolymer having a weight average molecular weight of from about 80,000 to about 500,000 obtained by the copolymerization of comonomers E, X, and Y wherein E is ethylene, X is a $C_3$ to $C_8$ $\alpha,\beta$-ethylenically unsaturated carboxylic acid, and Y is an alkyl acrylate or an alkyl methacrylate softening comonomer wherein the alkyl groups have from 1 to 8 carbon atoms, wherein E is present in an amount of from about 30 wt % to about 81 wt % based on the weight of the copolymer, X is present in an amount of from about 2 to about 30 wt. % of the copolymer, Y is present in an amount of from about 17 to about 35 wt. % of the copolymer;
    (b) one or more E/acrylic acid and/or E/methacrylic acid copolymers having a weight average molecular weight of from about 2,000 to about 30,000 and having from about 3 to about 20 wt. % acrylic acid and/or methacrylic acid present based on the weight of (b), the copolymer present in the composition in an amount of from about 5 to about 30 wt. % based on the combined weight of (a)+(b);
    and wherein the thermoplastic composition is at least partially neutralized by one or more alkali metal, transition metal, or alkaline earth metal.

12. The golf ball of claim 11, further comprising at least one thermoplastic polymer selected from the group consisting of copolyetheresters, copolyetheramides, elastomeric polyolefins, styrene diene block copolymers and thermoplastic polyurethanes.

13. The golf ball of claim 11 wherein at least 30% of the acid moieties of the composition are neutralized.

14. The golf ball of claim 13 wherein at least 45% of the acid moieties of the composition are neutralized.

15. The golf ball of claim 14 wherein the neutralizing agent has a cation selected from the group consisting of zinc, magnesium and lithium.

16. The golf ball of claim 15 wherein the neutralizing agent has a zinc cation.

17. The golf ball of claim 11 wherein sufficient filler is added to adjust the mass of the golf ball to a level meeting the limits set by the golfer's governing authority.

* * * * *